United States Patent [19]

Rothmann et al.

[11] Patent Number: 4,986,114
[45] Date of Patent: Jan. 22, 1991

[54] TEST APPARATUS FOR MOTOR VEHICLES, ESPECIALLY BRAKE TEST STAND FOR VEHICLES WITH ANTISKID BRAKE SYSTEMS

[75] Inventors: Werner Rothmann, Essen; Hans J. Meckelburg, Wuppertal, both of Fed. Rep. of Germany

[73] Assignee: Rheinisch-Westfälischer Technischer Überwachungs-Verein e.V.

[21] Appl. No.: 412,131

[22] Filed: Sep. 25, 1989

[30] Foreign Application Priority Data

Sep. 29, 1988 [DE] Fed. Rep. of Germany ....... 3833021
Jul. 8, 1989 [DE] Fed. Rep. of Germany ....... 3922570

[51] Int. Cl.$^5$ .............................. G01M 19/00
[52] U.S. Cl. ............................. 73/117; 73/126
[58] Field of Search .................... 73/117, 126, 123

[56] References Cited

U.S. PATENT DOCUMENTS 3,057,192 10/1962 Huffman et al. ............... 73/117
3,289,471 12/1966 Maxwell ........................ 73/117

Primary Examiner—Jerry W. Myracle
Attorney, Agent, or Firm—Toren, McGeady & Associates

[57] ABSTRACT

The invention deals with a traveling or driving simulator and especially a brake test stand for vehicles with antiskid brake systems, with drive rollers assigned to the vehicle wheels to be tested and slippage members, with adjustable slippage characteristic for brake torque dependent change of the drive torque between the drive rollers and the vehicle wheels, being assigned to the drive rollers. The drive rollers are coupled with each other by their drive shafts and driven by the flywheel masses of the rotating parts. In operation, the drive rollers can be accelerated up to the testing speed by the vehicle present upon the brake test stand. The slippage members are designed as electric or hydraulic machines controllable independently of each other. Thus, a slippage characteristic for different roadway conditions can be realized for each vehicle individually in a simple and optimized manner.

14 Claims, 5 Drawing Sheets

TEST APPARATUS FOR MOTOR VEHICLES, ESPECIALLY BRAKE TEST STAND FOR VEHICLES WITH ANTISKID BRAKE SYSTEMS

The invention is directed to test apparatus for motor vehicles, especially a brake test rig for vehicles with antiskid brake systems.

BACKGROUND OF THE INVENTION

Such apparatus require driving and support or backup rollers contacting the vehicle wheels to be tested. Typically, one slippage member, adjustable in its slippage characteristic, is assigned to the powered driving rollers for changing the driving torque between a vehicle and driving rollers dependent on the applied braking torque while maintaining the adherence or grip conditions between the vehicle wheel and the driving roller. Brake test rigs of this type are known for operational testing of vehicle brake installations with antiskid system, where the slippage between the vehicle wheel and the power drive is caused by actuating the vehicle brake. In particular, the driving torque of the driving roller acting upon the vehicle is changed as a function of the braking torque acting upon the vehicle wheel for simulating slippage, without changing the adherence or grip conditions between the vehicle wheel and driving roller. The change of the driving torque with application of the braking torque corresponds essentially to predeterminable adherence and slippage conditions between the vehicle wheel and the roadway. However, instead of actual slippage between the vehicle wheel and the driving roller, the slippage is simulated in the drive train. If an inadequate drive torque at the vehicle wheel is opposed to the braking torque, there occurs an rpm drop at the vehicle wheel, which corresponds to the rpm drop to which the response of the antiskid braking system is designed. By means of the slippage member, a slippage characteristic for different roadway conditions, as, for instance, dry roadway, wet roadway, iced-up roadway, etc. can be realized, so that it is possible to simulate on the test apparatus the braking actions without any wear and reproducibly as well as independently of external influences on the respective roadway surfaces. The precondition for this is that, when applying the braking torque, the driving torque in the rpm ranges to be investigated has to have the same behavior as the empirically determined slippage characteristics for the respective roadway surfaces.

In the known brake test rig for vehicles with antiskid brake systems, a driving roller with its own drive motor is provided for each vehicle wheel. This makes the entire installation expensive. In particular, the apparatus for slippage-dependent change of the driving torque can be formed by using an electrical induction motor as a drive motor. However, the possibility also exists to arrange a controllable magnetic particle clutch as a slippage member with adjustable slippage characteristics between the drive motor and the driving roller as the apparatus changing the drive torque as a function of the braking torque. These measures, however, further increase the cost of the entire installation.

SUMMARY OF INVENTION

The principal object of the invention is an apparatus of the foregoing type that overcomes or avoids many of the shortcomings of the known apparatus.

A further object of the invention is a test stand of the previously described type for motor vehicles, especially a brake test stand for vehicles with antiskid brake systems, having a reduced construction cost and improved operational characteristics.

In accordance with one feature of the brake test stand of the invention, the vehicle wheel driving rollers are coupled with each other by their drive shafts, and are driven during the simulated braking action by the flywheel masses of the rotating parts of the brake test rig, and the slippage members are designed as electrical or hydraulic machines with differential gearing which are controllable independently of each other, or as controllable electrical machines with a slip ring transmitter.

According to a preferred embodiment of the invention, the driving rollers can be accelerated up to the test speed by the vehicle motor of the vehicle on the brake test rig and thereafter they are driven by the flywheel masses of the rotating parts, so that they do not require any drive motors of their own. There exists, however, also the possibility within the framework of the invention that a common drive motor is provided for all the drive rollers independently of the vehicle which has to be tested. This embodiment also achieve a considerable simplification as far as the entire arrangement is concerned. In either case, the features of the invention entail that, by means of the machines which are controllable independently, the slippage characteristic can be changed for each vehicle wheel also during the braking action, such as, for instance, to simulate:

- division of coefficient of friction, meaning roadway surfaces with different tire tractions on the left and right hand side, or
- frictional discontinuity or gaps, meaning a sudden change of the friction coefficient from high to low or in reverse.

The function of a "Select-low" or "Select-high" regulation of an antiskid braking system can be verified by simulation of the frictional coefficient division. "Select-low" regulation means that the braking pressure of the vehicle axis concerned is regulated on the vehicle wheel rolling on a low coefficient of friction (smooth roadway surface). In "Select-high" regulation, one regulates appropriately on the vehicle wheel rolling on a high coefficient of friction. This is achieved by controlling the electrical or hydraulic machines assigned to the respective vehicle wheels. These latter machines can be known eddy current brakes, whose characteristic curves can be adjusted to different slippage characteristics as a function of preset coefficients of friction between the vehicle wheel and the surface of the roadway. Because in the course of the braking action on the test stand one brakes from a certain initial speed down to a full stop, the effective threshold of the antiskid system can be determined, namely, one can determine up to which vehicle speed the antiskid brake system is functioning.

Additional features of the invention are enumerated below. Thus, the present invention provides that the eddy current brakes are arranged, respectively, between the drive rollers and their drive shafts. In accordance with another embodiment of the invention, used independently or in combination, the eddy current brakes are installed separately from the drive rollers and each eddy current brake acts through a differential gear box upon the drive roller assigned to it, and the differential gear box is connected on the one side to the drive roller and on the other side to its drive shaft and is acted upon by the eddy current brakes. Thus, the eddy current brakes can be moved outwards and be installed independently of the drive rollers, for instance they can be attached to the test stand frame. Because of this the housings of the eddy current brakes are not required to rotate with the drive shaft and slip ring transmitters can be eliminated as would ordinarily be required if the eddy current brakes were operated between the drive rollers and their drive shafts. In addition a wide spectrum of operational rpm's of the eddy current brakes is possible by selection of the gear ratios, which facilitates the generation of certain characteristic curves.

In accordance with a further feature of the invention, which can also be used independently or in combination, a drive for flywheel mass compensation of the parts rotating with the drive roller is connected on the driving side of each drive roller, and this drive is regulated as a function of the revolving speed change of the drive roller. In this connection, this feature of the invention is based on the concept that excessive flywheel masses change the regulation properties of an antiskid braking system; however these flywheel masses can be eliminated, so that essentially realistic conditions can be realized. This flywheel mass compensation can however also be achieved by appropriate regulation of the eddy current brakes.

The eddy current brakes can be provided respectively with torque measuring apparatus. With this feature, a braking force curve can be determined by measuring the respective drive torque, which brake force curve can additionally serve for judging the antiskid function. Furthermore, this measured variable can be utilized for assisting the regulation of the eddy current brake along a predetermined characteristic curve.

In accordance with the invention, a brake test stand for motor vehicles, particularly for vehicles with antiskid brake systems, is realized which is distinguished by reduced construction costs and optimized construction to produce the required functions because an optimized reproduction of the braking action on a roadway can be achieved by specifically defined slippage characteristics.

According to a refined embodiment of the invention, which again can be independent or used in combination, the test stand is designed as a travel or driving simulator. For this purpose, torque sensors are connected to the slippage members and rpm sensors connected to the backup rollers, and a controllable energy storage accumulator with a mechanical flywheel mass as well as a drive and braking member operates upon the drive shafts of the drive rollers. An electronic control apparatus is provided to receive the signals of the torque sensors and the rpm sensors and controls the slippage members and the drive and braking member of the energy accumulator as a function of the processed signals. Because of these features of the invention, the drive rollers are coupled with each other not only by means of the slippage shaft but also by a common energy storage. The coupling of the drive rollers can according to the invention be accomplished not only mechanically but also electrically (electrical signals) or hydraulically. The backup rollers equipped with rpm sensors fulfill the function of probing rollers. The slippage members transmit a torque predetermined as a function of the rpm difference between the drive roller and the drive shaft. Furthermore, this aspect of the invention provides that the travel simulator comprises a fan for the simulation of winds encountered whole driving, and this fan is also controlled by the electronic control instrument as a function of the processed signals of the torque sensors and the rpm sensors. In order to make possible an adjustable wheel base, the energy storage can power the drive shafts of the drive rollers by means of a central shaft adjustable in length with interposition of differential gear trains.

All the dynamic and stationary driving conditions while driving in a straight line can be simulated under predetermined roadway conditions with any random vehicle by means of the travel simulator of the invention. This is achieved by an individual adjustment of the slippage conditions for each wheel and by the controllable energy storage. With the individually adjustable slippage members, it is possible to reproduce or simulate the following:

any and all roadways (frictional lock-slippage-conditions), transitions from roadway to roadway (discontinuities in the coefficient of friction), roadways with tire tractions which are different on the left and right hand side ($\mu$-split), static axial load changes (for instance, when driving over mountains or through valleys or when hauling a trailer), dynamic axial load changes depending on retardation or acceleration, compensation of the masses of the travel simulator rotating directly with the vehicle wheel, By controlling the energy storage, it is possible to simulate or reproduce:

equivalent vehicle flywheel mass, travel resistance (rolling, slope, and air resistance), By simulating the wind encountered is driving, cooling of the brakes and the vehicle motor dependent as a function of the speed is achieved.

In view of the functional modes described, the travel simulator in the invention is suitable for the following applications:

a) application area "propulsion", measurement of the motor or wheel output, measurement of the acceleration performance, determination of the traction on different roadways, testing of the functional mode and the effect of the drive slippage regulation system (ASR) under any type of roadway conditions, simulation of starting processes with trailer load, investigation of wheel drive systems, simulation of different travel cycles for testing emissions, b) area "brakes";

measurement of retardation and braking distance at any chosen roadway conditions, functional tests of brake antiskid systems under any chosen roadway conditions including changing from one roadway to the other (sudden change of $\mu$) and division of coefficient of friction ($\mu$-split), testing of the braking force distribution between front and rear axle with simultaneous measurement of the tire road adhesion circle utilization, simulation of continuous braking when driving down an incline, testing of brakes in four-wheel drive vehicles.

SUMMARY OF DRAWINGS

The invention is now described with particularity with the help of drawings depicting several preferred embodiments thereof, wherein.

DETAILED DESCRIPTION OF PREFERRED EMBODIMENTS

Figure 1:
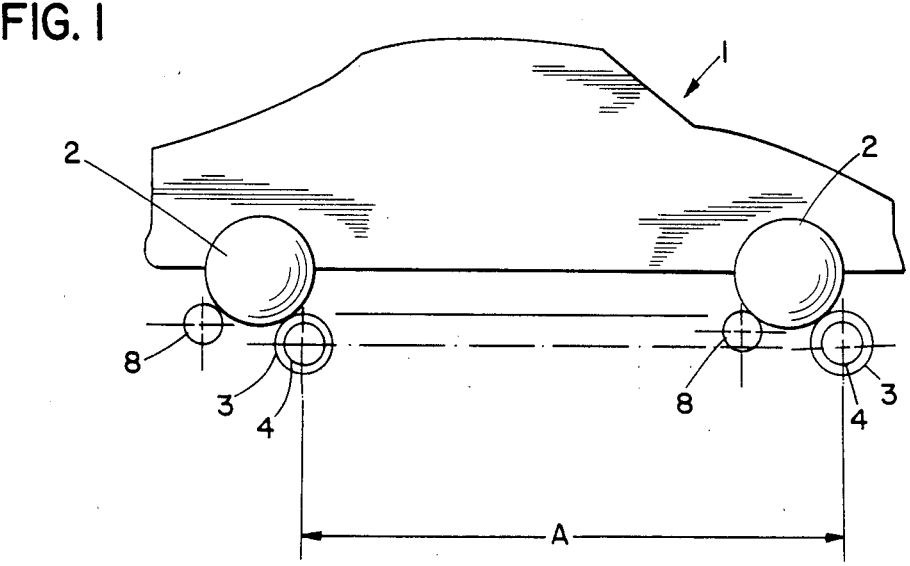
FIG. 1 is a schematic side view of a test stand of the invention as a brake test rig.
Figure 2:
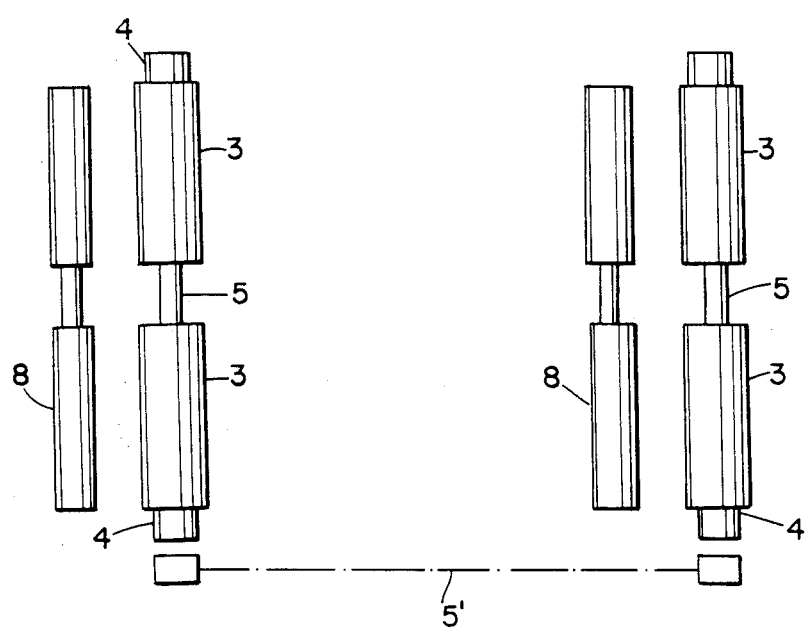
FIG. 2 shows the stand in FIG. 1 viewed from the top, without a vehicle.

A brake test rig for motor vehicles especially for vehicles 1 with antiskid braking systems is depicted in FIGS. 1 to 6. This braking test rig includes in its basic structure driving rollers 3 contacting the vehicle wheels 2 to be tested, with a slippage member 4, whose slippage characteristic is adjustable, associated, respectively, with, each of the driven driving rollers 3 for changing the drive torque between each vehicle wheel 2 and driving roller 3 upon changing the braking torque and while maintaining the adhesion or grip characteristics between each vehicle wheel 2 and its driving roller 3. The drive rollers 3 are coupled with each other by their drive shafts 5 and a link 5' and the drive rollers 3 are driven during the simulated braking process by the flywheel or inertial masses of the rotating parts of the test brake apparatus. The slippage members 4 are known eddy current brakes 4 which can be regulated independently of each other. The driving rollers 3 are accelerated by the motor of the vehicle 1 located on the braked test stand up to the testing speed and they then continue to rotate with the same rpm. After the vehicle motor has been declutched from the driving wheels, the driving rollers 3 which rotate at the traveling speeds can be braked down to zero. The driving torque acting upon the vehicle wheels 2 involved through the flywheel masses of the rotating parts and finally upon the driving rollers 3 is changed during the braking process as a function of the braking torque acting upon the vehicle wheels 2 in order to simulate a slippage. This is accomplished without changing the adhesive conditions between the vehicle wheels 2 and drive rollers 3.

Figure 5:
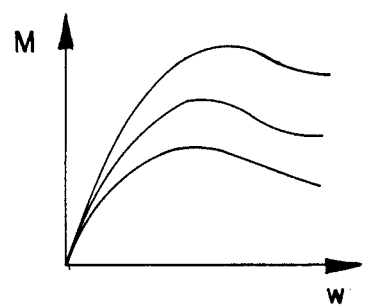
FIG. 5 is a characteristic curve of an eddy current brake.
Figure 6:
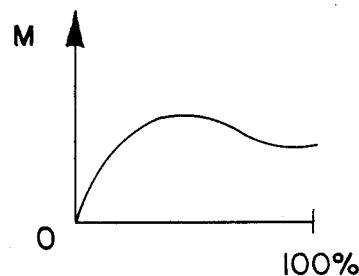
FIG. 6 is a diagram of the regulation of an eddy current brake as a function of preset slippage conditions.

The change of the drive torque with application of the braking torque corresponds to essentially presettable gripping and slippage conditions between the vehicle wheels 2 and the surface of a roadway. The presetting of the gripping and slippage conditions or the associated drive torque is accomplished by regulating the eddy current brake 4. This is possible because, by controlling the excitation current to the eddy current brakes in a known manner, different slippage characteristics can be simulated. The simulation of different slippage characteristics by controlling the excitation current is possible, since the characteristic curve of an eddy current brake corresponds to that of a slippage curve and in both cases a largely coinciding torque dependence exists. This is illustrated in FIGS. 5 and 6. FIG. 5 shows the characteristic curves of an eddy current brake for three different excitation current conditions, whereas FIG. 6 shows a similar curve representing the regulation of an eddy current brake as a function of preset slippage conditions. In both curves, torque is shown along the vertical axis, and rotational speed and percent slippage along the respective horizontal axes of FIGS. 5 and 6.

Figure 3:
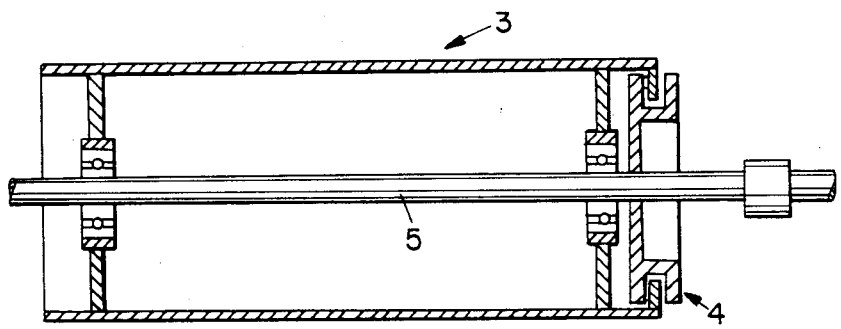
FIG. 3 is an axial cross-section through a drive roller with an eddy current brake schematically indicated.
Figure 4:
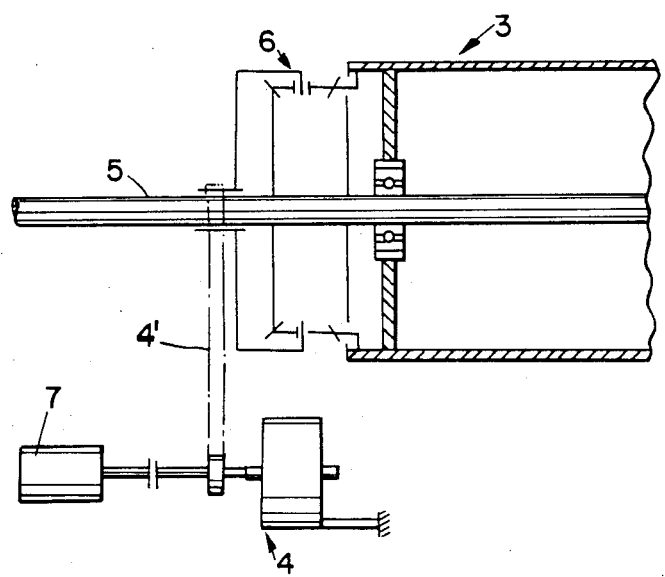
FIG. 4 is an axial cross-section through a drive roller with an eddy current brake moved outwards.

The eddy current brakes 4 can be located as shown in FIGS. 1 and 3 between the drive rollers 3 and the drive shafts 5. According to a preferred embodiment, however, the eddy current brakes 4 are installed separately from the drive rollers 3 and each eddy current brake 4 acts upon its associated drive roller 3 through an interposed known differential gear train 6 as shown in FIG. 4. In this embodiment, each differential gear train 6, shown schematically, is connected on the one hand to a drive roller 3 and on the other hand to its drive shaft 5 and is acted upon or controlled by the eddy current brake 4 via a link shown schematically at 4'. A drive 7 is also connected to each drive roller 3 and regulated as a function of the revolving speed changes of this drive roller 3 for the purpose of flywheel mass compensation of the parts rotating together with the drive roller 3. Furthermore, the eddy current brakes 4 are each equipped with a torque measuring arrangement (not shown). In the two axle brake test rig depicted in FIGS. 1 and 2, the wheel base A is adjustable. Each of the sets of rollers includes a driving roller 3 and a backup roller 8. The backup rollers 8 serve for measuring the vehicle wheel speeds.

Figure 7:
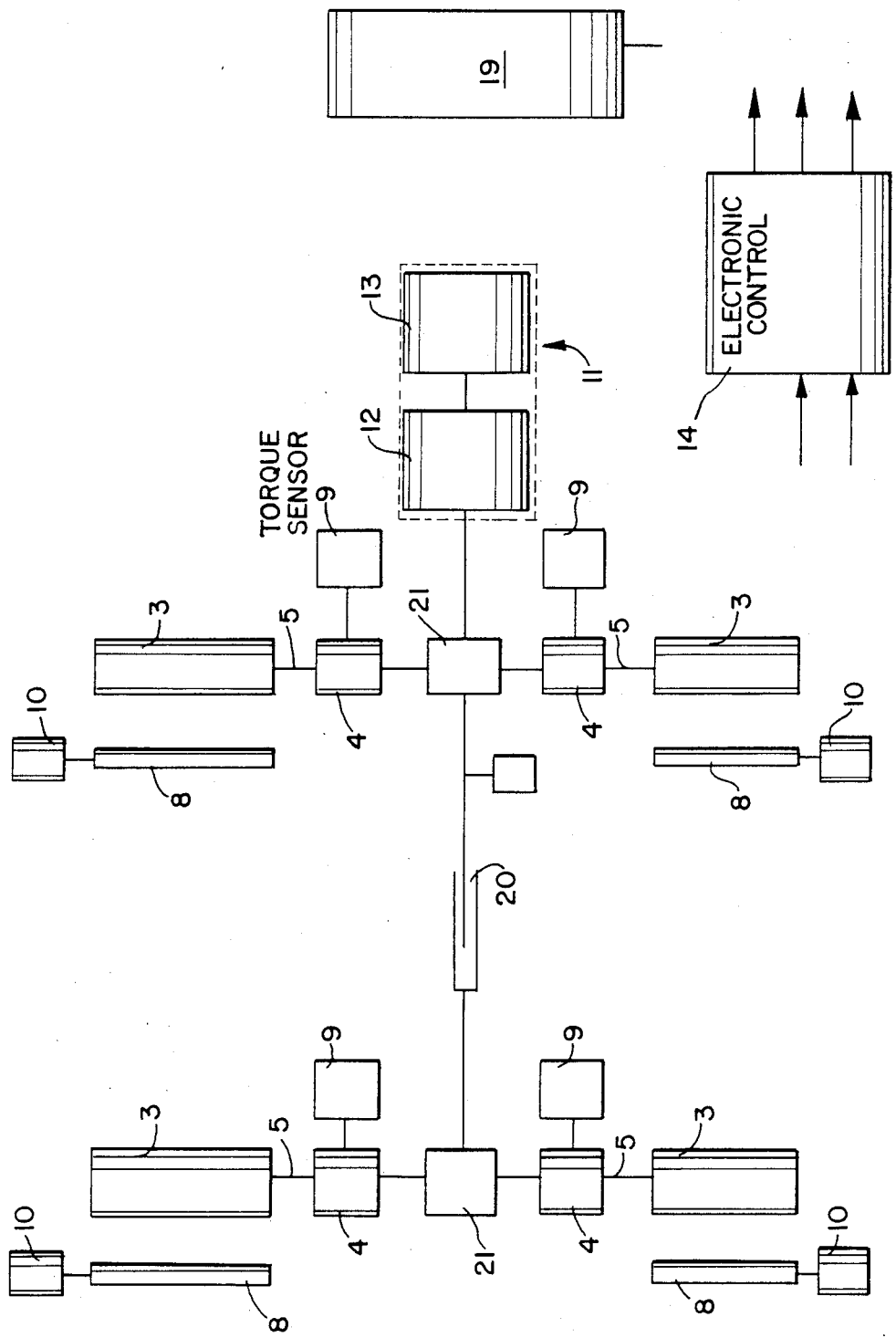
FIG. 7 is a block diagram of a test stand of the invention as a travel simulator.
Figure 9:
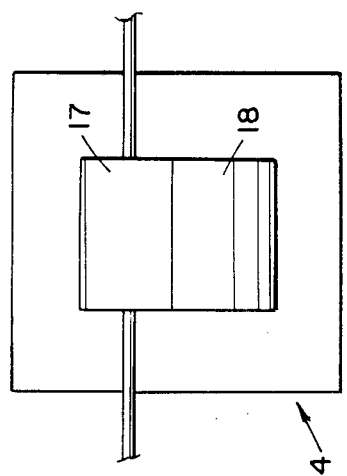
FIG. 9 shows another embodiment of the slippage member in diagrammatic illustration.
Figure 8:
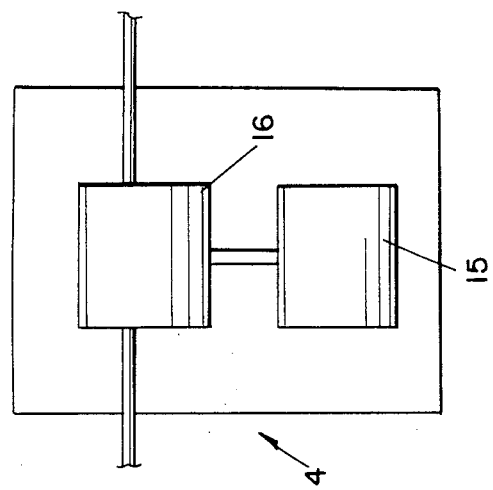
FIG. 8 shows one embodiment of a slippage member in diagrammatic illustration.

FIGS. 7 to 9 show a test stand of the invention designed as a travel or driving simulator. Corresponding elements have the same reference numerals as in FIGS. 1-4. For this purpose, torque sensors 9 are connected to the slippage members 4, and rpm sensors 10 to the backup rollers 8. A controllable energy storage 11 with a mechanical flywheel mass 12 as well as a drive and a braking member 13 acts upon the drive shafts 5 of the driving rollers 3. An electronic control apparatus 14 receives the signals of the torque sensors 9 and the rpm sensors 10, shown by the input arrows, processes these signals, and controls the slippage members 4 and the drive and braking member 13 of the energy storage 11 via output signals represented by the output arrows. The means to do this will be evident to those skilled in this art.

The slippage members 4 of the embodiment of FIGS. 8 and 9 are designed as controllable electric or hydraulic machines 15 with a differential gear train 16 (FIG. 8), or as a controllable electric machine 17 with a slip ring transmitter 18 (FIG. 9). These components are per se well known in the art. Such machines can also be used as slippage members 4 in the previously described brake test rigs of FIGS. 1-4. The travel simulator of FIG. 7 additionally includes a fan 19 for simulation of wind encountered while driving. The fan 19 is also controlled by an output signal from the electronic control apparatus 14 as a function of the processed signals of the rpm sensors 10. The energy storage 11 drives the drive shafts 5 of the drive rollers 3 through a longitudinally length-adjustable central shaft 20 via an interposed differential gear train 21. The length adjustable central shaft 20 enables the achievement of the adjustable wheel base for the test stand, represented by the dimension A in FIG. 1.

While the invention has been described in connection with preferred embodiments, it will be understood that modifications thereof within the principles outlined above will be evident to those skilled in the art and thus the invention is not limited to the preferred embodiments but is intended to encompass such modifications.

We claim:

1. Test apparatus for motor vehicles comprising a stand having drive rollers and backup rollers for contacting the vehicle wheels to be tested, flywheel masses associated with rotating parts of the test apparatus, an adjustable slippage member associated with each of the drive rollers for brake-torque- dependent changing of the drive torque between the vehicle wheels and the drive rollers while maintaining adherence conditions between the vehicle wheels and drive rollers, means for coupling the drive rollers with each other and for driving same during a simulated brake process by the said flywheel masses, said slippage members each being an electrical or hydraulic machine controllable independently of each other.

2. Test apparatus according to claim 1, characterized in that the drive rollers are unconnected to separate drive means and are brought up to speed solely by the vehicle motor of a vehicle present on the brake test stand.

3. Brake test apparatus for motor vehicles with antiskid brake systems, comprising a stand having drive rollers and backup rollers for contacting the vehicle wheels to be tested, an adjustable slippage member connected to each of the drive rollers for brake-torque-dependent change of the drive torque between the vehicle wheels and the drive rollers rollers while maintaining the adherence conditions between the vehicle wheels and drive rollers, said drive rollers being coupled with each other and being driven during a simulated brake process by flywheel masses of the rotating parts of the test apparatus, said slippage members being electrical or hydraulic machines controllable independently of each other.

4. Test apparatus according to claim 3, wherein said slippage members comprise a differential gear train connected to the machine.

5. Test apparatus according to claim 3, wherein said slippage members comprise an electrical machine and a slip ring transmitter connected to the machine.

6. Test apparatus according to claim 3, wherein a common drive motor is connected to all of the drive rollers.

7. Test apparatus according to claim 1 or 3, wherein the slippage members comprise eddy current brakes.

8. Test apparatus according to claim 7, comprising drive shafts rotatably supporting the drive rollers, the eddy current brakes being located between each drive roller and its drive shaft.

9. Test apparatus according to claim 7, comprising drive shafts rotatably supporting the drive rollers, said eddy current brakes being connected separately from the drive rollers, and a differential gear train being connected between each eddy current brake and its associated drive roller, said differential gear train being connected on one side to a drive roller and on the other side to its drive shaft and being acted upon by the eddy current brake.

10. Test apparatus according to claim 3, comprising a drive connected to each drive roller, means for regulating the drive as a function of the revolving speed change of a drive roller for flywheel mass compensation of the parts rotating with the drive roller.

11. Test apparatus according to claim 3, comprising a torque measuring device connected to the eddy current brake.

12. Test apparatus according claim 3, wherein said test stand functions as a travel simulator, further comprising drive shafts rotatably supporting the drive rollers, torque sensors connected to the slippage members, rpm sensors connected to the backup rollers, a controllable energy storage having a mechanical flywheel mass and braking member connected to the drive shafts, and electronic control apparatus for receiving and processing signals outputted by the torque sensors and the rpm sensors for controlling the slippage members and the braking member of the energy storage as a function of the processed signals.

13. Test apparatus according to claim 12, comprising a fan for simulation of wind encountered when driving, said fan being controlled by the electronic control apparatus as a function of the processed signals.

14. Test apparatus according to claim 12, wherein said energy storage has an adjustable length central shaft connected to the drive shafts of the drive rollers, and a differential gear train connected to the central shaft.

* * * * *